United States Patent [19]

Ueyama

[11] Patent Number: 5,530,306
[45] Date of Patent: Jun. 25, 1996

[54] MAGNETIC BEARING APPARATUS

[75] Inventor: Hirochika Ueyama, Hirakata, Japan

[73] Assignee: Koyo Seiko Co., Ltd., Osaka, Japan

[21] Appl. No.: 227,462

[22] Filed: Apr. 14, 1994

[30] Foreign Application Priority Data

Apr. 14, 1993 [JP] Japan ................... 5-087632

[51] Int. Cl.⁶ .................... H02K 7/09
[52] U.S. Cl. ............ 310/90.5; 310/90; 361/146; 324/207.11
[58] Field of Search .......... 310/90.5, 90; 361/146; 324/207.11

[56] References Cited

U.S. PATENT DOCUMENTS

| 4,999,534 | 3/1991 | Andrianos | 310/90.5 |
| 5,247,219 | 9/1993 | Nakagawa et al. | 310/90.5 |
| 5,376,871 | 12/1994 | Takara et al. | 318/610 |

FOREIGN PATENT DOCUMENTS

| 500464 | 8/1992 | European Pat. Off. |
| 59-159418 | 9/1984 | Japan. |
| 2097714 | 4/1990 | Japan. |
| 2-97714 | 4/1990 | Japan ................... 32/4 |

*Primary Examiner*—Steven L. Stephan
*Assistant Examiner*—Elvin G. Enad
*Attorney, Agent, or Firm*—Popham, Haik, Schnobrich & Kaufman, Ltd.

[57] ABSTRACT

In a magnetic bearing apparatus, a rotating member having an axis of rotation along the horizontal direction is supported by a pair of radial magnetic bearings each including a plurality of electromagnets in the radial direction with clearances with the rotating member in two portions in the axial direction. The apparatus comprises a pair of position detecting sensors for detecting the displacement in the radial direction of the rotating member in the two positions in the axial direction of the rotating member and a control device for controlling magnetic attraction forces produced by the electromagnets on the basis of output signals from the respective sensors. The control device calculates the magnetic attraction force produced by each of the radial magnetic bearings on the basis of the output signal from each of the sensors, a value of a control current supplied to the electromagnets in the radial magnetic bearing, and an attraction force coefficient of the electromagnets in the radial magnetic bearing, to calculate the position of the center of gravity of the rotating member on the basis of comparison of the operated magnetic attraction forces.

4 Claims, 5 Drawing Sheets

MAGNETIC BEARING APPARATUS

CROSS REFERENCE TO RELATED APPLICATION

This application claims priority benefits under 35 USC §119 of Japanese Patent Application Serial No. 5-87632, the disclosure of which is incorporated by reference.

BACKGROUND OF THE INVENTION

1. Field of the Invention

The present invention relates to a magnetic bearing apparatus for raising a spindle of a machine tool or the like to the surface to control the position thereof.

2. Description of the Related Art

There has been conventionally a magnetic bearing apparatus so adapted as to support a rotating member, for example, a rotor of a spindle of a machine tool by magnetic forces of two magnetic bearings disposed in two positions in the axial direction with clearances between the magnetic bearings and the rotor, detect the position of the rotor by a position sensor, and control a current supplied to electromagnets in the two magnetic bearings on the basis of a detection signal of the position sensor, thereby to hold the rotor in a reference position (a target position).

Furthermore, in the above described control, the translation motion and the tilt motion concerning the center of gravity of the rotor are separately controlled.

In the above described magnetic bearing apparatus, however, when a tool such as a grindstone or a cutter mounted on an end of the rotor is replaced on the way, the quantity of state such as the position of the center of gravity of the rotor is changed, so that position control becomes unstable, for example.

Therefore, there is provided a control device so adapted as to input the weight of a tool by inputting means when the tool is replaced to operate, for example, the position of the center of gravity (see Japanese Patent Laid-Open Gazette No. 97714/1990).

In the above described control device, however, the weight of the tool must be previously grasped, so that it takes a lot of time and labor to replace the tool.

SUMMARY OF THE INVENTION

An object of the present invention is to provide a magnetic bearing apparatus which can automatically calculate a new position of the center of gravity even if an addition heavy product is mounted on a rotating member and can be suitably used particularly when the translation motion and the tilt motion concerning the center of gravity of the rotating member are separately controlled.

In order to attain the above described object, the present invention is characterized, in one mode, by comprising first and second radial magnetic bearings each including a plurality of electromagnets for exerting magnetic attraction forces produced by the electromagnets on a rotating member having an axis of rotation along the horizontal direction in two positions spaced apart from each other in the axial direction of the rotating member and respectively supporting the rotating member in the radial direction with clearances with the rotating member, first and second position detecting means for respectively detecting the positions in the radial direction of the rotating member in the two positions in the axial direction of the rotating member, and a control device for adjusting the magnetic attraction forces respectively produced by the electromagnets in the first and second radial magnetic bearings on the basis of output signals of the first and second position detecting means to hold the rotating member in a predetermined position in the radial direction, the control device comprising a magnetic attraction force calculating portion for calculating the magnetic attraction force produced by each of the radial magnetic bearings on the basis of the output signal of each of the position detecting means, a value of a control current supplied to the electromagnets in the radial magnetic bearing, and an attraction force coefficient of the electromagnets in the radial magnetic bearing, and a center-of-gravity position calculating portion for calculating the position of the center of gravity of the rotating member on the basis of comparison of the calculated magnetic attraction forces produced by both the radial magnetic bearings.

In accordance with the above described mode, the magnetic attraction force calculating portion operates the magnetic attraction force produced by each of the radial magnetic bearings on the basis of the output signal of each of the position detecting means, the value of the control current supplied to the electromagnets in the radial magnetic bearing and the attraction force coefficient of the electromagnets in the radial magnetic bearing, and the center-of-gravity position calculating portion calculates the position of the center of gravity on the basis of the comparison of the calculated magnetic attraction forces produced by both the radial magnetic bearings. Particularly, even when an addition product having an unknown weight is mounted on the rotating member, the position of the center of gravity is calculated on the basis of the magnetic attraction force produced by each of the radial magnetic bearings after mounting the addition product, thereby to make it possible to find an accurate position of the center of gravity. Consequently, the present invention is suitable for the application to an apparatus for supporting a spindle of a machine tool. In addition, the present invention is suitable for the application to a system of separately controlling the translation motion and the tilt motion concerning the center of gravity of the rotating member, that is, a separate control system. The reason for this is that in the separate control system, the position of the center of gravity of the rotating member must be determined in advance.

Furthermore, the present invention is characterized, in a preferred mode, in that the output signal of each of the position detecting means is corrected by adding a correction signal so set that the result of the calculation executed by the magnetic attraction force calculation portion becomes zero at the unloading time. In this case, a high-precision operation of the magnetic attraction forces can be executed, thereby to make it possible to find the position of the center of gravity of the rotating member with high precision and consequently, to control the position of the rotating member with high precision.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

The present invention will be described in detail with reference to the accompanying drawings showing embodiments.

Figure 1:
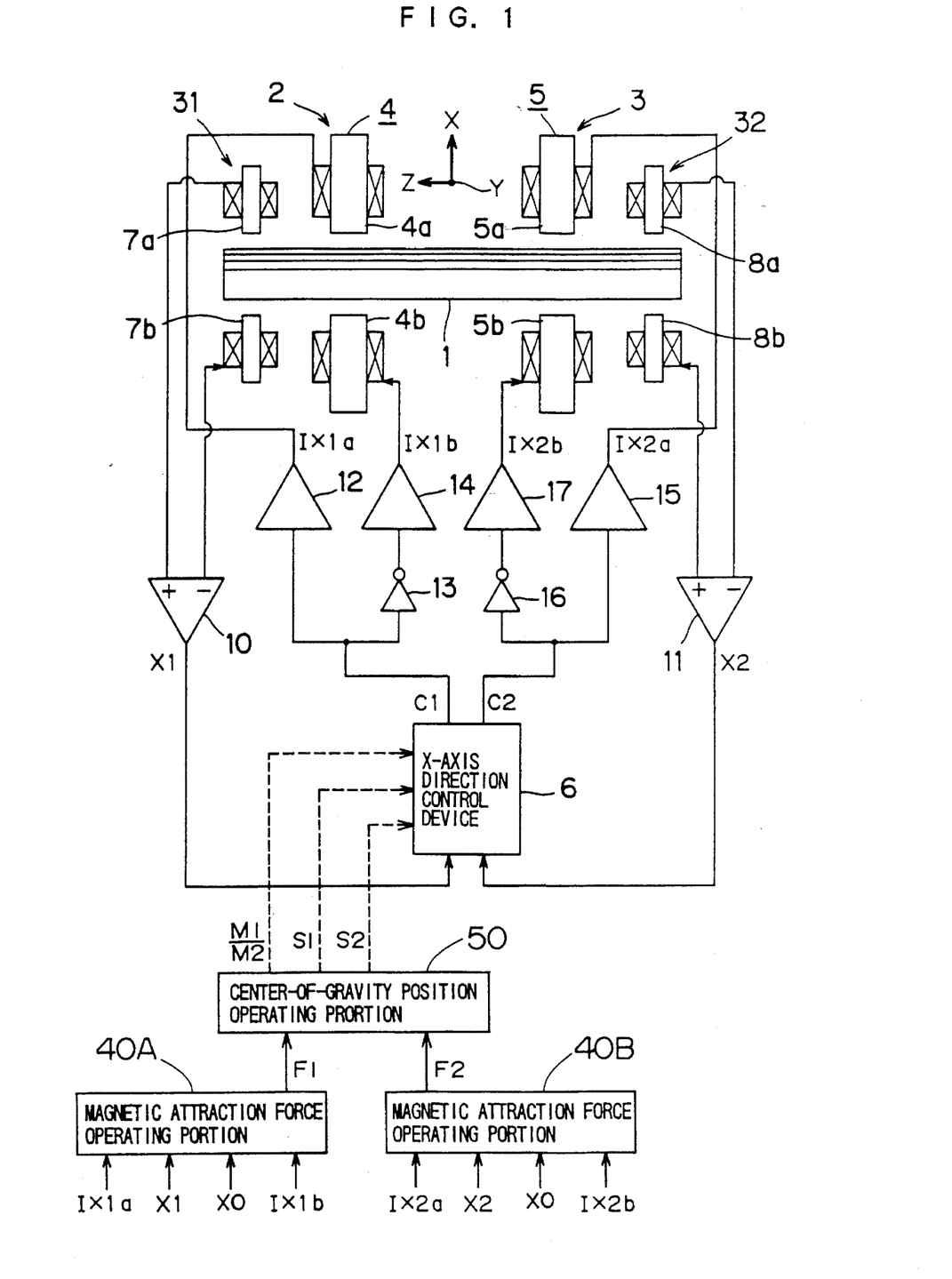
FIG. 1 is a schematic diagram showing the construction of a magnetic bearing apparatus according to one embodiment of the present invention.

FIG. 1 shows a principal part of a magnetic bearing apparatus of a five-degrees-of-freedom control type and its control device as one embodiment of the present invention. In the following description, "upper", "lower" and "left" and "right" refer to FIG. 1.

The magnetic bearing apparatus comprises one axial magnetic bearing (not shown) and two left and right radial magnetic bearings 2 and 3 for supporting a rotating member 1 with clearances with the rotating member 1.

The axial magnetic bearing supports the rotating member 1 in the Z-axis direction (in the horizontal direction, that is, the right and left direction in FIG. 1). The radial magnetic bearings 2 and 3 support the rotating member 1 in the radial direction. Each of the radial magnetic bearings 2 and 3 comprises a portion for supporting the rotating member 1 in the X-axis direction orthogonal to the Z-axis (in the vertical direction, that is, the up and down direction in FIG. 1) (an X-axis direction magnetic bearing) and a portion for supporting the rotating member 1 in the Y-axis direction orthogonal to the Z-axis and the X-axis (the direction orthogonal to the paper of FIG. 1) (a Y-axis direction magnetic bearing). The X-axis direction magnetic bearings 4 and 5 are illustrated in FIG. 1. The radial magnetic bearings 2 and 3 comprise a portion for controlling the X-axis direction magnetic bearings 4 and 5 (an X-axis direction control device) and a portion for controlling the Y-axis direction magnetic bearings. The X-axis direction control device 6 is illustrated in FIG. 1.

Furthermore, position sensors 31 and 32 for detecting the displacement of the rotating member 1 are respectively disposed in the vicinities of the radial magnetic bearings 2 and 3. The position sensors 31 and 32 respectively comprise portions for detecting the position of the rotating member 1 in the X-axis direction (position sensors 7a and 7b and 8a and 8b) and portions for detecting the position thereof in the Y-axis direction (not shown). The left radial magnetic bearing 2 shall be referred to as a first radial magnetic bearing, and the right radial magnetic bearing 3 shall be referred to as a second radial magnetic bearing. In addition, the left X-axis direction magnetic bearing 4 shall be referred to as a first magnetic bearing, and the right X-axis direction magnetic bearing 5 shall be referred to as a second magnetic bearing.

The X-axis direction magnetic bearings 4 and 5 and the X-axis direction control device 6 shown in FIG. 1 separately control the translation motion and the tilt motion of the rotating member 1 on a X–Z plane. The translation motion is motion in the X-axis direction of the center of gravity of the rotating member 1, and the tilt motion is rotary motion of the rotating member 1 around an axis passing through the center of gravity of the rotating member 1 and parallel to the Y-axis. The present embodiment is characterized in that when an unknown addition product is mounted on the rotating member 1 to change the position of the center of gravity, a center-of-gravity position calculating portion 50 calculates the position of the center of gravity on the basis of magnetic attraction forces F1 and F2 respectively calculated by a pair of magnetic attraction force calculating portions 40A and 40B to alter coefficients concerning the position of the center of gravity for calculations executed by the X-axis direction control device 6. The details of the calculations executed by the magnetic attraction force calculating portions 40A and 40B and the center-of-gravity position calculating portion 50 will be described later.

The X-axis direction magnetic bearings 4 and 5 respectively comprise a pair of electromagnets 4a and 4b and a pair of electromagnets 5a and 5b so disposed that the rotating member 1 is interposed therebetween on both its sides in the X-axis direction. The electromagnets 4a and 4b of the first magnetic bearing 4 shall be referred to as first electromagnets, and the electromagnets 5a and 5b of the second magnetic bearing 5 shall be referred to as second electromagnets.

The above described pairs of position sensors 7a and 7b and 8a and 8b are respectively disposed in the vicinities of the electromagnets 4a and 4b and 5a and 5b of the X-axis direction magnetic bearings 4 and 5 so that the rotating member 1 is interposed therebetween on both its sides in the X-axis direction. The position sensors 7a and 7b disposed in the vicinity of the first magnetic bearing 4 shall be referred to as first position sensors, and the position sensors 8a and 8b disposed in the vicinity of the second magnetic bearing 5 shall be referred to as second position sensors.

Outputs of the pair of first position sensors 7a and 7b are inputted to a first subtracter 10, thereby to calculate displacement in the X-axis direction X1 on the left side of the rotating member 1. Outputs of the pair of second position sensors 8a and 8b are inputted to a second subtracter 11, thereby to calculate displacement in the X-axis direction X2 on the right side of the rotating member 1. The first position sensors 7a and 7b and the first subtracter 10 constitute first position detecting means for detecting the position in the X-axis direction on the left side of the rotating member 1. The second position sensors 8a and 8b and the subtracter 11 constitute second position detecting means for detecting the position in the X-axis direction on the right side of the rotating member 1.

A driving signal C1 of the first electromagnets 4a and 4b which is a first output of the control device 6 is inputted to a first power amplifier 12 constituting electromagnet driving means for driving the upper left electromagnet 4a, and is inputted to a second power amplifier 14 constituting electromagnet driving means for driving the lower left magnet 4b through an inverter 13. A constant stationary current is caused to flow through coils of the first electromagnets 4a and 4b when the driving signal C1 is zero, and the value of the current flowing through the coils is controlled by the driving signal C1. A driving signal C2 of the second electromagnets 5a and 5b which is a second output of the control device 6 is inputted to a third power amplifier 15 constituting electromagnet driving means for driving the upper right electromagnet 5a, and is inputted to a fourth power amplifier 17 constituting electromagnet driving means for driving the lower right electromagnet 5b through an inverter 16. A constant stationary current is also caused to flow through coils of the second electromagnets 5a and 5b when the driving signal C2 is zero, and the value of the current flowing through the coils is controlled by the driving signal C2. The values of the currents flowing through the coils of the first and second electromagnets 4a, 4b, 5a and 5b are thus controlled, whereby the translation motion and the tilt motion of the rotating member 1 are separately controlled.

Figure 2:
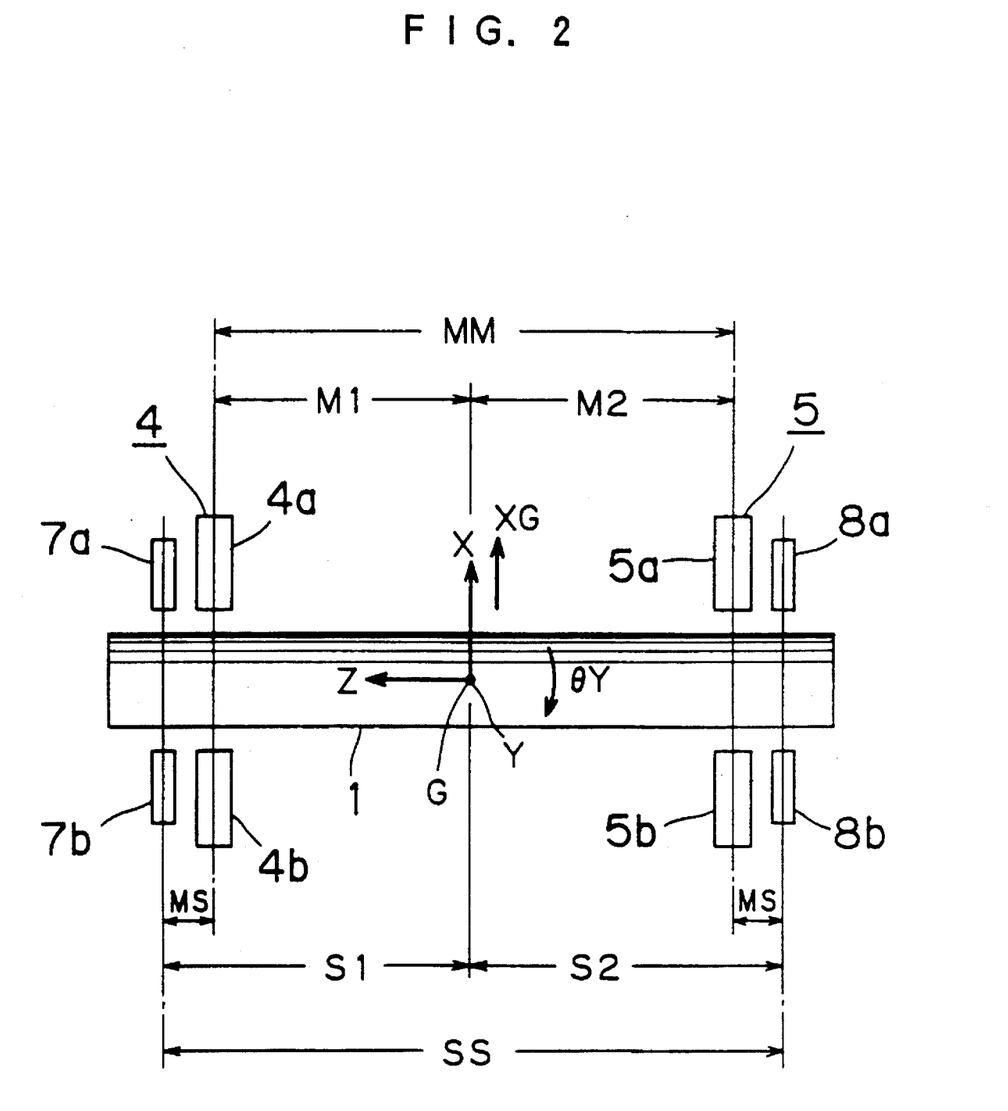
FIG. 2 is a schematic diagram showing the positional relationship among a rotating member, electromagnets in magnetic bearings and position sensors in the magnetic bearing apparatus.

FIG. 2 shows the positional relationship among the rotating member 1, the electromagnets 4a, 4b, 5a and 5b, and the position sensors 7a, 7b, 8a and 8b.

In FIG. 2, the center of gravity of the rotating member 1 is represented by G. The distance in the axial direction from the center of gravity G to the first electromagnets 4a and 4b is taken as M1, the distance in the same direction from the center of gravity G to the second electromagnets 5a and 5b is taken as M2, the distance in the same direction from the center of gravity G to the first position sensors 7a and 7b is taken as S1, and the distance in the same direction from the center of gravity G to the second position sensors 8a and 8b is taken as S2. In addition, it is assumed that M1+M2=MM (constant), and S1+S2=SS (constant). In addition, the amount of displacement in the X-axis direction of the center of gravity G is represented by XG, and the amount of tilt around the center of gravity G of the rotating member 1 on an X–Z plane, that is, the amount of tilt of the rotating member 1 around an axis parallel to the Y-axis passing through the center of gravity G is represented by θy.

Figure 3:
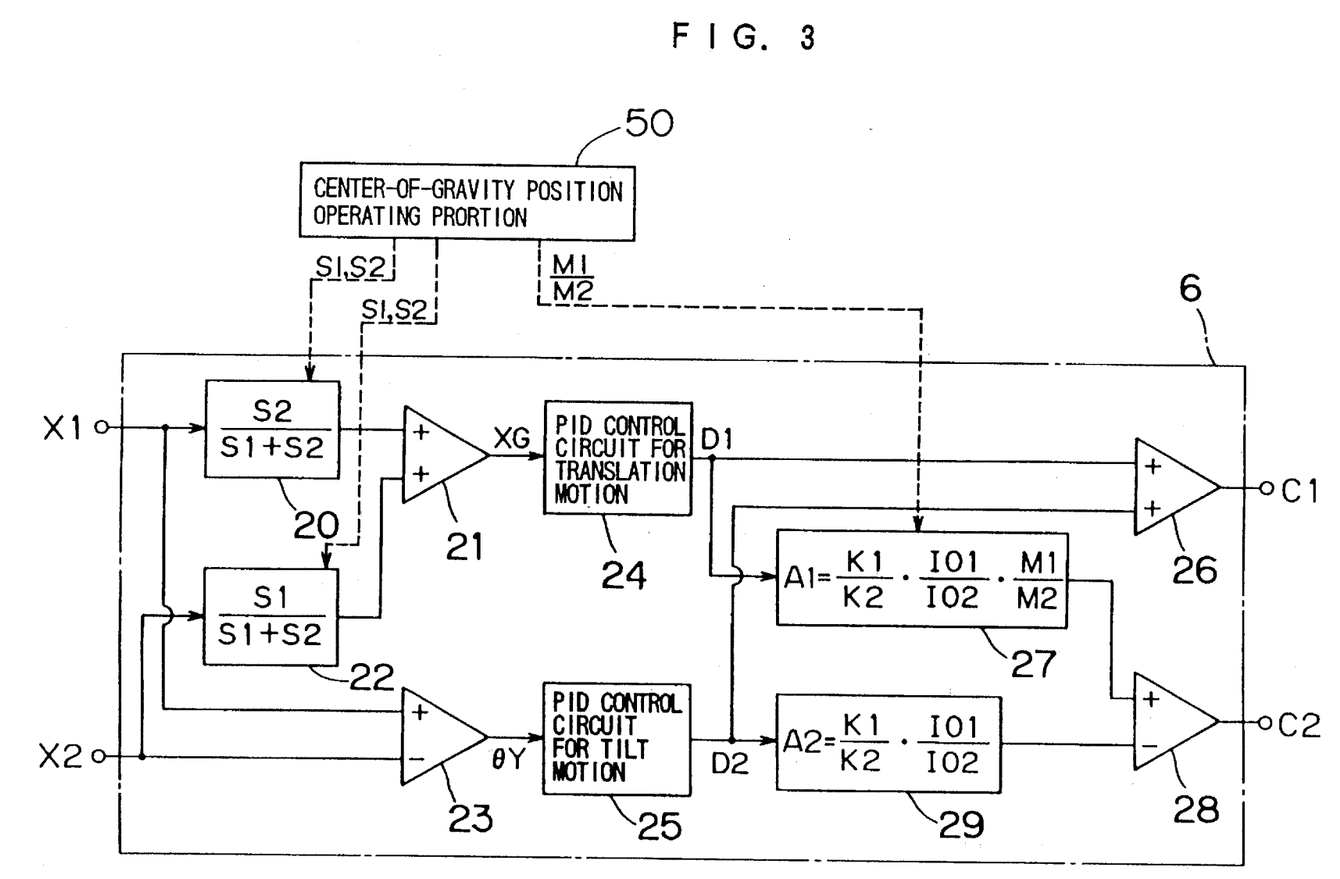
FIG. 3 is a block diagram showing an X-axis direction control device.

FIG. 3 shows one example of the control device 6. In FIG. 3, an output X1 of the first subtracter 10 is multiplied by [S2 / (S1+S2)] in a first amplifier 20 and the product of X1 and [S2 / (S1+S2)] is inputted to a first adder 21, an output X2 of the second subtracter 11 is multiplied by [S1 / (S1+S2)] in a second amplifier 22 and the product of X2 and [S1 / (S1+S2)] is inputted to a first adder 21. The respective products are added to each other in the first adder 21, thereby to calculate the amount of displacement XG. In the first and second amplifiers 20 and 22, the outputs X1 and X2 are respectively multiplied by coefficients based on the distances S1 and S2 from the center of gravity G to the position sensors 7a and 7b and the position sensors 8a and 8b, and the respective products of X1 and X2 and the coefficients are added to each other. Even when the distances are not equal to each other, therefore, the amount of displacement XG can be always accurately calculated.

The first and second amplifiers 20 and 22 as well as the first adder 21 constitute displacement amount calculating means for calculating the amount of displacement XG of the rotating member 1 from the outputs of the first and second subtracters 10 and 11. The outputs of the first and second subtracters 10 and 11 are also inputted to two input terminals of a third subtracter 23, whereby the amount of tilt θy of the rotating member 1 is calculated. The third subtracter 23 constitutes tilt amount calculating means for calculating the amount of tilt θY of the rotating member 1 from the outputs of the first and second subtracters 10 and 11. The output XG of the first adder 21 is inputted to a PID control circuit for translation motion 24 constituting translation motion control means, and such a translation motion control signal D1 that the amount of displacement XG becomes zero is outputted from the circuit 24. The output θY of the third subtracter 23 is inputted to a PID control circuit for tilt motion 25 constituting tilt motion control means, and such a tilt motion control signal D2 that the amount of tilt θY becomes zero is outputted from the circuit 25. The outputs D1 and D2 of the two control circuits 24 and 25 are inputted to input terminals of a second adder 26, and a driving signal C1 of the first electromagnets 4a and 4b is outputted from the adder 26.

The translation motion control signal D1 is inputted to a fourth subtracter 28 through a third amplifier 27, and the tilt motion control signal D2 is inputted to a fourth subtracter 28 through a fourth amplifier 29. A first coefficient A1 times the translation motion control signal D1 is outputted from the third amplifier 27, and a second coefficient A2 times the tilt motion control signal D2 is outputted from the fourth amplifier 29. In the fourth subtracter 28, A2 times the tilt motion control signal D2 is subtracted from A1 times the translation motion control signal D1, so that a driving signal C2 of the second electromagnets 5a and 5b is outputted.

The first signal A1 and the second signal A2 are represented as follows:

$$A1 = (K1 / K2) \cdot (I01 / I02) \cdot (M1 / M2) \quad (1)$$

$$A2 = (K1 / K2) \cdot (I01 / I02) \quad (2)$$

In the equations, K1 is an attraction force coefficient of the first electromagnets 4a and 4b, K2 is an attraction force coefficient of second electromagnets 5a and 5b, I01 is a value of a stationary current supplied to the first electromagnets 4a and 4b, and I02 is a value of a stationary current supplied to the second electromagnets 5a and 5b.

In order to control the translation motion and the tilt motion in a completely separate manner in the above described magnetic bearing apparatus, it is necessary that no tilt motion is newly brought about by attraction forces of the first and second electromagnets 4a, 4b, 5a and 5b which are produced by the translation motion control signal D1, and no translation motion is newly brought about by attraction forces of the first and second electromagnets 4a, 4b, 5a and 5b which are produced by the tilt motion control signal D2.

The conditions under which no tilt motion is newly brought about by the attraction forces of the first and second electromagnets 4a, 4b, 5a and 5b which are produced by the translation motion control signal D1 are that no moment for causing tilt motion is generated by the attraction force F1 of the first electromagnets 4a and 4b proportional to a control current value IC1 which is produced by the translation motion control signal D1 and the attraction force F2 of the second electromagnets 5a and 5b proportional to a control current value IC2 which is produced by the tilt motion control signal D2. The relationship between IC1 and IC2 satisfying the conditions is as follows:

$$IC2 / IC1 = (K1 / K2) \cdot (I01 / I02) \cdot (M1 / M2) \quad (3)$$

A right side in this equation is equal to the first coefficient A1. In the above described magnetic bearing apparatus, the translation motion control signal D1 is directly inputted to the second adder 26 for outputting the driving signal C1 of the first electromagnets 4a and 4b, and A1 times the translation motion control signal D1 is inputted to the fourth subtracter 28 for outputting the driving signal C2 of the second electromagnets 5a and 5b, so that IC1 and IC2 satisfy the conditions of the foregoing equation. Consequently, no tilt motion is newly brought about by the attraction forces of the first and second electromagnets 4a, 4b, 5a and 5b which are produced by the translation motion control signal D1.

The conditions under which no translation motion is newly brought about by the attraction forces of the first and second electromagnets 4a, 4b, 5a and 5b which are produced by the tilt motion control signal D2 are that the attraction force F1 of the first electromagnets 4a and 4b proportional to the control current value IC1 which is produced by the tilt motion control signal D2 and the attraction force F2 of the second electromagnets 5a and 5b proportional to the control current value IC2 which is produced by the tilt motion control signal D2 are in balance. The relationship between IC1 and IC2 satisfying the conditions is as follows:

$$IC2/IC1=(K1/K2)\cdot(I01/I02) \quad (4)$$

A right side in this equation is equal to the second coefficient A2. In the above described magnetic bearing apparatus, the tilt motion control signal D2 is directly inputted to the second adder 26 for outputting the driving signal C1 of the first electromagnets 4a and 4b, and A2 times the tilt motion control signal D2 is inputted to the fourth subtracter 28 for outputting the driving signal C2 of the second electromagnets 5a and 5b, so that IC1 and IC2 satisfy the conditions of the foregoing equation. Consequently, no translation motion is newly brought about by the attraction forces of the first and second electromagnets 4a, 4b, 5a and 5b which are produced by the tilt motion control signal D2.

In the above described magnetic bearing apparatus, therefore, no tilt motion is newly brought about by the attraction forces of the first and second magnets 4a, 4b, 5a and 5b which are produced by the translation motion control signal D1, and no translation motion is newly brought about by the attraction forces of the first and second electromagnets 4a, 4b, 5a and 5b which are produced by the tilt motion control signal D2, thereby to make it possible to control the translation motion and the tilt motion in a completely separate manner.

Description is now made of calculations executed by the magnetic attraction force calculating portions 40A and 40B and the center-of-gravity position calculating portion 50 in a case where the tool is replaced, for example. A magnetic attraction force F exerted on an object by electromagnets is generally represented by $F=K(I/X)^2$ using a current I flowing through the electromagnets, the distance X between the electromagnets and the object and an attraction force coefficient K of the electromagnets. Therefore, the magnetic attraction force calculating portions 40A and 40B respectively calculate a magnetic attraction force F1 of the first electromagnets 4a and 4b and a magnetic attraction force F2 of the electromagnets 5a and 5b by the following calculation expressions:

$$F1=K1\ [IX1a/(X0+X1)]^2-K1\ [IX1b/(X0-X1)]^2 \quad (5)$$

$$F2=K2\ [IX2a/(X0+X2)]^2-K2\ [IX2b/(X0-X2)]^2 \quad (6)$$

In the expressions, IX1a is a control current value of the first electromagnet 4a, IX1b is a control current value of the first electromagnet 4b, and X1 is the amount of displacement of the rotating member 1 toward the electromagnet 4b from the center of the electromagnets 4a and 4b. In addition, IX2a is a control current value of the second electromagnet 5a, IX2b is a control current value of the second electromagnet 5b, and X2 is the amount of displacement of the rotating member 1 toward the electromagnet 5b from the center of the electromagnets 5a and 5b. Further, X0 is a set air gap value between the rotating member 1 and each of the electromagnets 4a, 4b, 5a and 5b.

Figure 4:
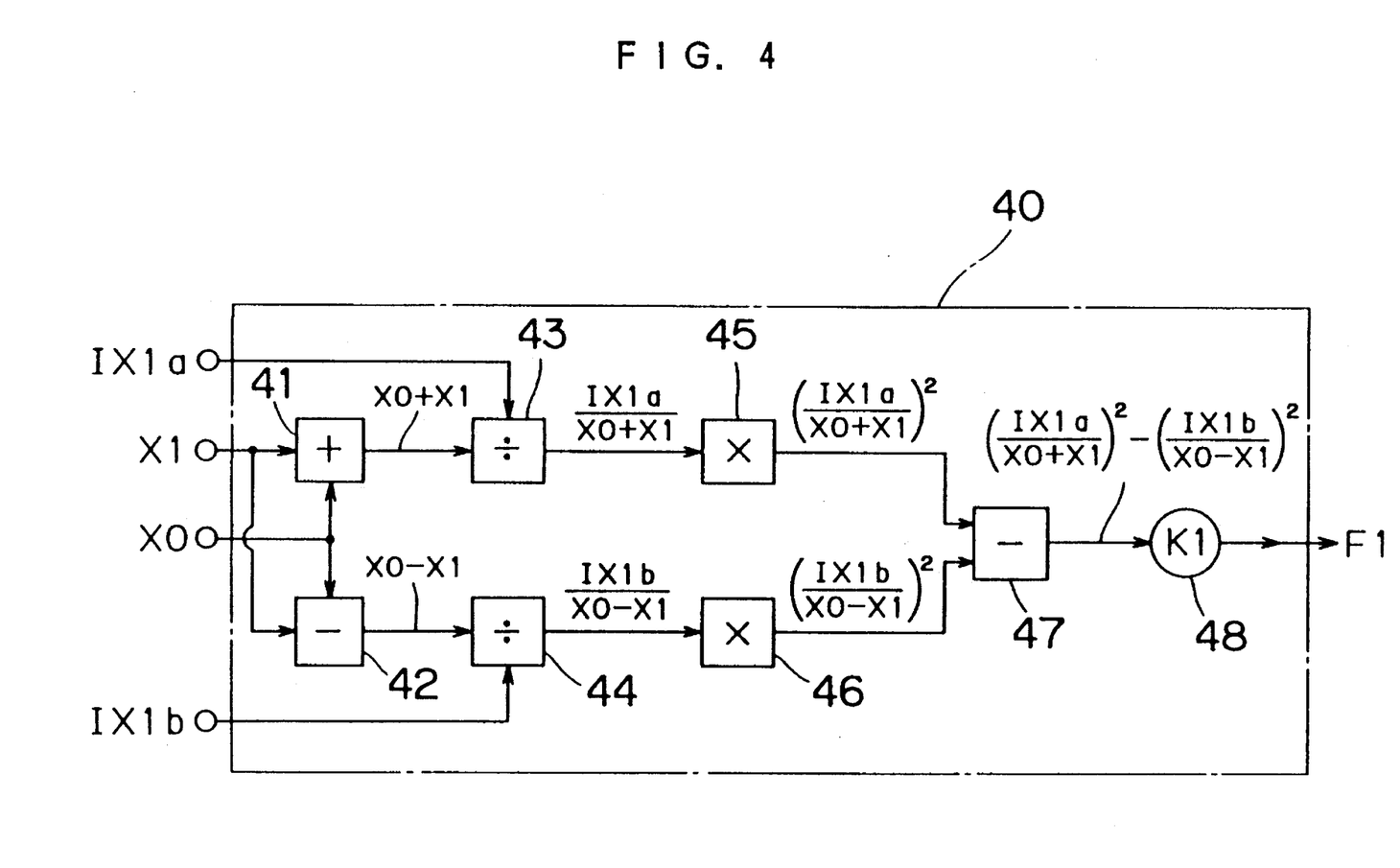
FIG. 4 is a block diagram showing a magnetic attraction force calculating portion.

FIG. 4 is a block diagram showing the magnetic attraction force calculating portion 40A. Referring to FIGS. 1 to 4, the control current value IX1a of the first electromagnet 4a, the control current value IX1b of the first electromagnet 4b, the amount of displacement X1 of the rotating member 1 toward the electromagnet 4b from the center of the electromagnets 4a and 4b, and the signal X0 corresponding to the set air gap value are inputted to the magnetic attraction force calculating portion 40A.

Referring to FIG. 4, signals having a value of (X0+X1) and a value of (X0−X1) obtained by addition and subtraction in an adder 41 and a subtracter 42 are respectively signals corresponding to gaps between the electromagnets and the rotating member 1. Dividers 43 and 44 respectively receive the signals IX1a and IX1b and the signals (X0+X1) and (X0−X1) to execute calculations IX1a / (X0+X1) and IX1b / (X0−X1). Reference numerals 45 and 46 denote square multipliers for executing a square calculation, which respectively receive signals from the divider 43 and 44 to execute calculations, thereby to obtain signals of $[IX1a/(X0+X1)]^2$ and $[IX1b/(X0-X1)]^2$. The signal of $[IX1b/(X0-X1)]^2$ is subtracted from the signal of $[IX1a/(X0+X1)]^2$ by a subtracter 47, and the result of the subtraction is multiplied by K1 by a coefficient multiplier 48, thereby to obtain a signal F1 having a value of $K1\ [IX1a/(X0+X1)]^2-K1\ [IX1b/(X0-X1)]^2$. In addition, the control current value IX2a of the second electromagnet 4a, the control current value IX2b of the second electromagnet 5b, the amount of displacement X2 of the rotating member 1 toward the electromagnet 5b from the center of the electromagnets 5a and 5b, and the signal X0 corresponding to the set air gap value are inputted to the magnetic attraction force calculating portion 40B, thereby to obtain a signal F2 in the same manner as that in the case of the magnetic attraction force calculating portion 40A.

Description is now made of calculation executed by the center-of-gravity position calculating portion 50 for finding a new position of the center of gravity. The following equation holds from a balance between moments generated by forces around the center of gravity G:

$$M1/M2=F2/F1 \quad (7)$$

On the other hand, the following equation holds:

$$M1+M2=MM\ (\text{constant}) \quad (8)$$

Accordingly, the respective distances M1 and M2 from the center of gravity G to the first and second electromagnets 4a and 4b and 5a and 5b are found from both the following equations (9) and (10) on the basis of the equations (7) and (8):

$$M1=MM/[1+(F1/F2)] \quad (9)$$

$$M2=MM/[1+(F2/F1)] \quad (10)$$

Furthermore, the following equations hold:

$$S1=M1+MS \quad (11)$$

$$S2=M2+MS \quad (12)$$

From the equations (9) and (12), the respective distances S1 and S2 from the center of gravity G to the first and second position sensors 7a and 7b and 8a and 8b are as follows:

$$S1=MM/[1+(F1/F2)]+MS \quad (13)$$

$$S2=MM/[1+(F2/F1)]+MS \quad (14)$$

When the position of the center of gravity G is changed by replacing the tool, for example, the coefficient A1 in the third amplifier 27 is altered on the basis of a new value of M1 / M2 obtained by the foregoing equation (3) which is calculated by the center-of-gravity position calculating portion 50.

Furthermore, the respective coefficients in the first amplifier 20 and the second amplifier 22 are altered on the basis of new values of S1 and S2.

According to the present embodiment, even if an addition product having a unknown weight is mounted on the rotating member 1, it is possible to carry out control which is adapted to a new state only by automatically calculating the position of the center of gravity G on the basis of comparison of the magnetic attraction forces F1 and F2 of the magnetic bearings 4 and 5 after the mounting and altering some of the coefficients on the basis of the calculated position of the center of gravity G. Consequently, the present invention can be easily applied to a separate control system for separately controlling the translation motion and the tilt motion concerning the center of gravity G of the rotating member 1. Particularly, the present invention is suitable for the application to a rotor of a spindle of a machine tool.

Figure 5:
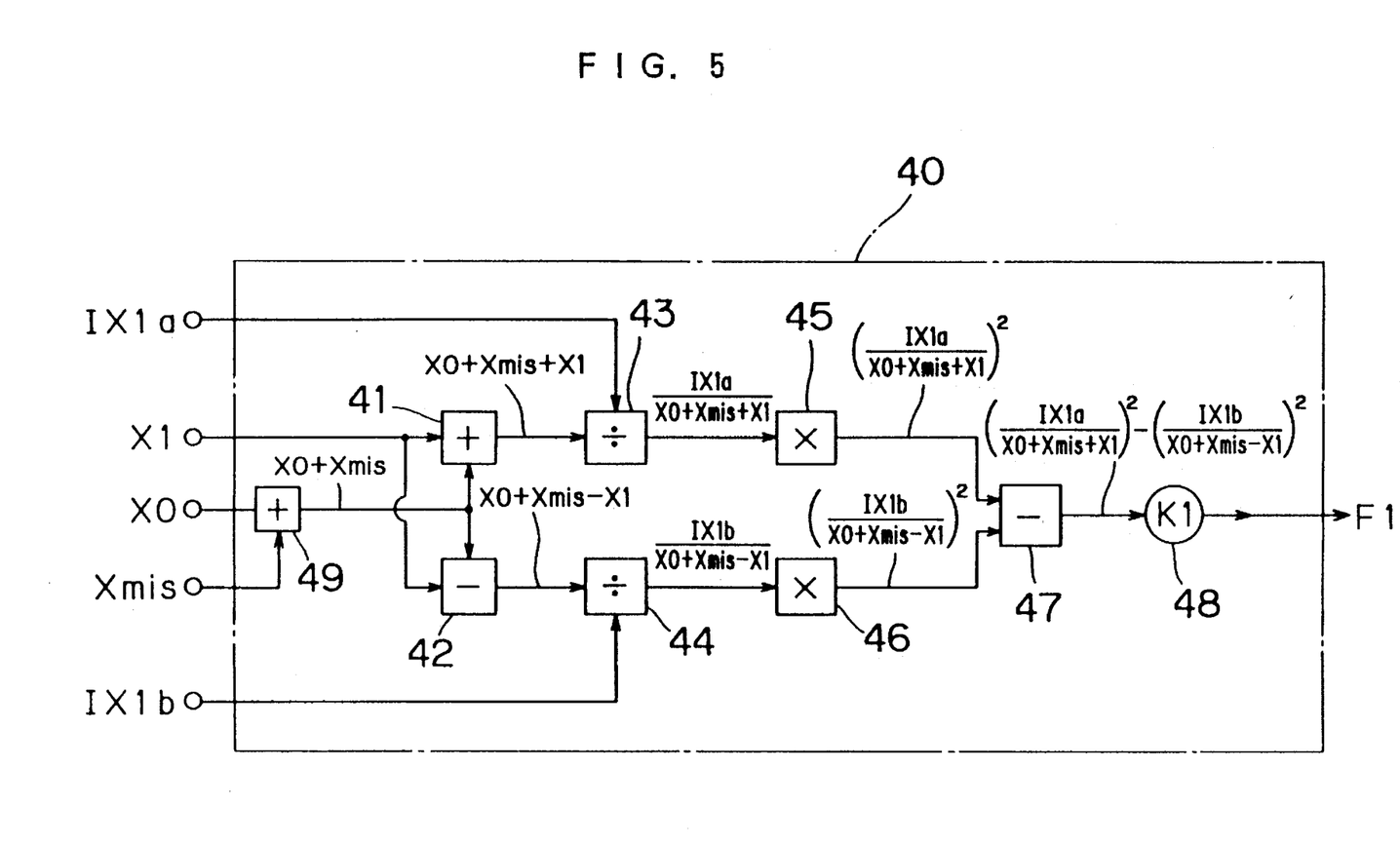
FIG. 5 is a block diagram showing a modified example of a magnetic attraction force calculating portion.

FIG. 5 shows another embodiment of the present invention. Referring to FIG. 8, the present embodiment differs from the embodiment shown in FIG. 1 in that there is provided an adder 49 for adding a correction signal Xmis for correcting misalignment to a signal X0 corresponding to a set air gap, and the signal X0 corresponding to the set air gap is replaced with a signal obtained by the addition (X0+ Xmis). The correction signal Xmis is previously set by volume control or the like so that the result of the calculation of the magnetic attraction force F1 by the magnetic attraction force calculating portion 40A becomes zero at the unloading time. In this case, a high-precision operation of the magnetic attraction force can be executed, thereby to make it possible to find the position of the center of gravity G of the rotating member 1 with high precision and consequently, to control the position of the rotating member 1 with high precision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic bearing apparatus comprising:

first and second radial magnetic bearings each including a plurality of electromagnets for exerting magnetic attraction forces produced by said electromagnets on a rotating member having an axis of rotation along a horizontal direction in two positions spaced apart from each other in an axial direction of said rotating member and respectively supporting said rotating member in a radial direction with clearances with said rotating member;

first and second position detecting means for respectively detecting positions in the radial direction of said rotating member in the two positions in the axial direction of said rotating member; and a control device for adjusting said magnetic attraction forces respectively produced by said electromagnets in said first and second radial magnetic bearings based upon output signals of said first and second position detecting means to hold said rotating member in a predetermined position in the radial direction, said control device comprising;

magnetic attraction force calculating means for calculating said magnetic attraction force produced by each of said radial magnetic bearings based upon said output signal of each of said position detecting means, a value of a control current supplied to said electromagnets in said radial magnetic bearings, and an attraction force coefficient of said electromagnets in said radial magnetic bearings, and center of gravity position calculating means for calculating a position of a center of gravity of said rotating member based upon comparison of said calculated magnetic attraction forces produced by both of said radial magnetic bearings, and means or adjusting said magnetic attraction forces based upon output signals of said first and second position detecting means and said calculated position of said center of gravity of said rotating member.

2. The magnetic bearing apparatus according to claim 1, wherein:

said output signal of each of said first and second position detecting means is corrected by adding a correction signal so set that a result of the calculation performed by said magnetic attraction force calculating means becomes zero at an unloading time.

3. A magnetic bearing apparatus comprising:

first and second radial magnetic bearings each including a plurality of electromagnets for exerting magnetic attraction forces produced by said electromagnets on a rotating member having an axis of rotation along a horizontal direction in two positions spaced apart from each other along an axial direction of said rotating member and respectively supporting said rotating member in a radial direction with clearances with said rotating member;

first and second position detecting means for respectively detecting positions in the radial direction of said rotating member in the two positions in the axial direction of said rotating member;

magnetic attraction force calculating means for calculating said magnetic attraction force produced by each of said radial magnetic bearings based upon an output signal of each of said position detecting means, a value of a controlled current supplied to said electromagnets in said radial magnetic bearings, and an attraction force coefficient of said electromagnets in said radial magnetic bearings, and center of gravity position calculating means for calculating a position of a center of gravity of said rotating member based upon comparison of the calculated magnetic attraction forces produced by both of said radial magnetic bearings;

displacement amount calculating means for calculating an amount of radial displacement of said calculated position of said center of gravity of said rotating member based upon said output signals of said first and second position detecting means;

tilt amount calculating means for calculating an amount of tilt around said calculated position of said center of gravity of said rotating member based upon said output signals of said first and second position detecting means;

translation motion control means for outputting such a translation motion control signal that said amount of radial displacement of said calculated position of the center of gravity of said rotating member becomes zero;

tilt motion control means for outputting such a tilt motion control signal that the amount of tilt around said calculated position of said center of gravity of said rotating member becomes zero; and first and second electromagnetic driving means for respectively driving said electromagnets in said first and second radial magnetic bearings based upon outputs of said translation motion control means and said tilt motion control means.

4. Magnetic bearing apparatus according to claim 3, wherein:

said output signals of each of said first and second position detecting means are corrected by adding a correction signal so set that a result of the calculation executed by said magnetic attraction force calculating means becomes zero at an unloading time.

* * * * *